United States Patent
Jung et al.

(10) Patent No.: US 8,116,390 B2
(45) Date of Patent: Feb. 14, 2012

(54) APPARATUS AND METHOD FOR ALLOCATING RESOURCES AND PERFORMING COMMUNICATION IN A WIRELESS COMMUNICATION SYSTEM

(75) Inventors: Jung-Soo Jung, Seongnam-si (KR); Dae-Gyun Kim, Seongnam-si (KR); Yu-Chul Kim, Seoul (KR); Beom-Sik Bae, Suwon-si (KR); Jin-Kyu Han, Seoul (KR); Hwan-Joon Kwon, Hwaseong-si (KR); Yun-Ok Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1337 days.

(21) Appl. No.: 11/708,649

(22) Filed: Feb. 20, 2007

(65) Prior Publication Data
US 2007/0237248 A1    Oct. 11, 2007

(30) Foreign Application Priority Data
Feb. 18, 2006   (KR) .................. 10-2006-0015951

(51) Int. Cl.
*H04L 27/28* (2006.01)
*H04L 1/02* (2006.01)
*H04J 11/00* (2006.01)
*H04W 4/00* (2009.01)
*H04W 72/00* (2009.01)

(52) U.S. Cl. ........ 375/260; 375/267; 370/203; 370/208; 370/210; 370/328; 370/329; 370/330; 370/331; 370/332; 370/333; 370/334; 455/450; 455/451; 455/452.1; 455/452.2

(58) Field of Classification Search .................. 375/260, 375/267; 370/311, 328, 329–334, 203, 208, 370/210; 455/450, 451, 452, 1
See application file for complete search history.

(56) References Cited

U.S. PATENT DOCUMENTS
5,781,536 A * 7/1998 Ahmadi et al. .............. 370/252
7,388,845 B2 * 6/2008 Laroia et al. .................. 370/311
(Continued)

FOREIGN PATENT DOCUMENTS
WO   WO2005081437   * 9/2005

OTHER PUBLICATIONS 802.16 IEEE Standard for Local and Metropolitan Area Networks; Part 16: Air Interface for Fixed Broadband Wireless Access Systems, IEEE Computer Society and IEEE MicrowaveTheory and Techniques Society, IEEE Std 802.16-2004, Oct. 1, 2004.

*Primary Examiner* — Khanh C Tran
*Assistant Examiner* — Eboni Hughes
(74) *Attorney, Agent, or Firm* — The Farrell Law Firm, P.C.

(57) ABSTRACT

Disclosed is a method for allocating resources in a base station of a wireless communication system that performs communication using frequency resources. The method includes dividing subcarriers into subcarrier sets each including a predetermined number of consecutive subcarriers, and generating a resource index table mapped to consecutive indexes such that a distance between subcarriers in the subcarrier sets is maximized; and determining an amount of resources to be transmitted through a downlink according to a channel condition, for data to be transmitted to each terminal, and allocating resources to the terminal using the index value in the resource index table.

51 Claims, 12 Drawing Sheets

U.S. PATENT DOCUMENTS

| | | | |
|---|---|---|---|
| 7,542,441 B2* | 6/2009 | Choi et al. | 370/328 |
| 7,643,832 B2* | 1/2010 | Cudak et al. | 455/450 |
| 7,680,199 B2* | 3/2010 | Armour et al. | 375/260 |
| 2002/0147017 A1 | 10/2002 | Li et al. | |
| 2002/0163879 A1 | 11/2002 | Li et al. | |
| 2004/0062193 A1* | 4/2004 | Ma et al. | 370/208 |
| 2004/0131007 A1* | 7/2004 | Smee et al. | 370/208 |
| 2005/0078759 A1 | 4/2005 | Zhang | |
| 2005/0157670 A1 | 7/2005 | Tang et al. | |
| 2005/0250506 A1* | 11/2005 | Beale et al. | 455/452.1 |
| 2007/0115795 A1* | 5/2007 | Gore et al. | 370/203 |
| 2008/0045225 A1* | 2/2008 | Nystrom et al. | 455/450 |

* cited by examiner

APPARATUS AND METHOD FOR ALLOCATING RESOURCES AND PERFORMING COMMUNICATION IN A WIRELESS COMMUNICATION SYSTEM

PRIORITY

This application claims the benefit under 35 U.S.C. §119 (a) of a Korean Patent Application filed in the Korean Intellectual Property Office on Feb. 18, 2006 and assigned Serial No. 2006-15951, the disclosure of which is incorporated herein by reference.

BACKGROUND OF THE INVENTION

1. Field of the Invention

The present invention relates generally to an apparatus and method for allocating resources and performing communication in a communication system, and, in particular, to an apparatus and method for allocating resources and performing communication using them in a wireless communication system.

2. Description of the Related Art

Communication systems have been developed to enable exchange of voice and data between terminals located far away from each other. In addition, a wireless communication system provides voice or data services between terminals in a specific area using wireless resources. The wireless communication system uses various multiple access schemes in order to perform communication with a plurality of terminals. The multiple access schemes are classified, according to resources used, into Code Division Multiple Access (CDMA) that performs multiple access using code resources, Frequency Division Multiple Access (FDMA) that performs multiple access using frequency resources, and Time Division Multiple Access (TDMA) that performs multiple access using time resources.

Of the schemes, the CDMA scheme is most generally used. However, the CDMA scheme has difficulty in transmitting a large amount of data due to a limited amount of available orthogonal codes. Research is currently being conducted on many schemes of using alternative resources other than the orthogonal codes, and one of these schemes is the FDMA scheme.

The FDMA scheme includes not only an Orthogonal Frequency Division Multiplexing (OFDM) scheme that transmits data using multiple carriers, but also a Single-Carrier FDMA (SC-FDMA) scheme which is proposed as an uplink multiple access scheme in the $3^{rd}$ Generation Partnership Project (3GPP) Long Term Evolution (LTE).

In wireless communication, the high-speed, high-quality data service generally depends on the channel environment. In wireless communication, the channel environment is subject to frequent change due to a change in power of a received signal, caused by fading as well as Additive White Gaussian Noise (AWGN), shadowing, a Doppler effect caused by movement of a terminal and a frequent change in its velocity, interference from other users and multi-path signals, and the like.

Therefore, wireless communication needs to effectively cope with the foregoing issues in order to support the high-speed, high-quality data service. One of the typical transmission schemes and techniques used for overcoming channel fading in the general FDMA systems, such as OFDM and SC-FDMA, includes a frequency diversity technique. In the frequency diversity technique, if good and bad channels occur alternatively in a frequency domain, symbols in one data packet are transmitted over a broad band, thereby uniformly experiencing both the good and bad channels. In terms of reception performance, because modulation symbols included on one packet include both symbols experiencing bad channels and symbols experiencing good channels, the frequency diversity technique can demodulate the packet using the symbols experiencing good channels. The diversity technique is suitable for traffic susceptible to delay, such as the real-time traffic, or traffic that should not be applied only to the channel environment of a specific user, like the broadcast channel, the common control channel, and the like.

FIG. 1 illustrates exemplary unit resources allocable for transmitting data using a frequency diversity technique. In FIG. 1, reference numeral 110 indicates a subcarrier, which is a basic unit of the frequency domain, in an OFDM system, and indicates a unit frequency resource corresponding to the subcarrier in an SC-FDMA system, referred to herein as a subcarrier. During frequency diversity transmission, subcarriers constituting a unit resource should be uniformly located over the full band so as to efficiently obtain frequency diversity, but should not necessarily be limited to a specific pattern. For convenience, it is assumed herein that subcarriers in a unit resource are located at regular intervals. Particularly, in a Distributed FDMA (DFDMA) scheme that uses the diversity technique in uplink SC-FDMA, if subcarriers are located at regular intervals, a low Peak-to-Average Power Ratio (PAPR) is possible due to the single carrier characteristic. In addition, a unit resource composed of hatched subcarriers 120 is defined as a subcarrier set, and the number of allocable subcarrier sets is denoted by R 130 in FIG. 1. The parameter R is equal to an interval between consecutive subcarriers in one subcarrier set as shown by reference numeral 130. The subcarrier sets are independently defined according to an offset of an initial subcarrier, which is a unique value for each individual subcarrier set. For example, in FIG. 1, reference numeral 120 indicates a subcarrier set with an offset that equals zero. For each individual subcarrier set, the offset value can be used as resource allocation information.

As described above, the subcarrier set is a basic unit for resource allocation. Therefore, a base station can allocate more than two subcarrier sets to one terminal according to the amount of transmission data or channel condition. In this case, a method of selecting arbitrary subcarrier sets and independently signaling offset values is not an efficient signaling method. Therefore, in allocating resources to a terminal, it is preferable for the base station to allocate subcarrier sets with consecutive offset values. Efficient signaling methods include a 1-dimensional resource allocation signaling method (or 1-D signaling of resource allocation) and a tree-structured resource allocation signaling method.

FIG. 2 illustrates an exemplary method of allocating more than two subcarrier sets to one terminal. Referring to FIG. 2, reference numeral 210 shows frequency resources allocated to a specific terminal or User Equipment (UE), and reference numeral 220 means a parameter R for an interval of a subcarrier set allocable in frequency resources as described in FIG. 1. As illustrated, subcarrier sets allocated to a specific UE (or UE1) have offset values of 0 and 1, respectively. If subcarrier sets with consecutive offset values are simultaneously allocated in this manner, an effect that subcarriers used by the corresponding terminal are uniformly distributed in the frequency domain may decrease, thereby limiting performance gain due to frequency diversity. Particularly, in DFDMA transmission, because subcarriers allocated to one terminal are not located at regular intervals, the single carrier characteristic disappears, causing an increase in the PAPR.

SUMMARY OF THE INVENTION

An aspect of the present invention is to address at least the problems and/or disadvantages and to provide at least the advantages described below. Accordingly, an aspect of the present invention is to provide an efficient resource allocation apparatus and method in a wireless communication system.

Another aspect of the present invention is to provide a resource allocation apparatus and method capable of reducing interference between base stations in a wireless communication system.

Yet another aspect of the present invention is to provide an apparatus and method capable of increasing diversity gain of transmission data in a wireless communication system.

According to one aspect of the present invention, there is provided a method for allocating resources in a base station of a wireless communication system that performs communication using frequency resources. The method includes dividing subcarriers into subcarrier sets each having a predetermined number of consecutive subcarriers, and generating a resource index table mapped to consecutive indexes such that a distance between subcarriers in the subcarrier sets is maximized; and determining an amount of resources to be transmitted through a downlink according to a channel condition, for data to be transmitted to each terminal, and allocating resources to the terminal using the index value in the resource index table.

According to another aspect of the present invention, there is provided a method for allocating resource in a wireless communication system including base stations that perform communication with a terminal using frequency resource. The method includes dividing subcarriers into subcarrier sets each having a predetermined number of consecutive subcarriers, and generating a default resource index table mapped to consecutive indexes such that a distance between subcarriers in the subcarrier sets is maximized; generating a resource index table using unique information for each of the base stations from the default resource index table; and determining an amount of resources to be transmitted through a downlink according to a channel condition, for data to be transmitted to each terminal, and allocating resources to the terminal using the index value in the resource index table.

According to a further aspect of the present invention, there is provided a method for receiving data in a terminal of a wireless communication system that performs communication using frequency resource. The method includes dividing subcarriers into subcarrier sets each having a predetermined number of consecutive subcarriers, and generating a default resource index table mapped to consecutive indexes such that a distance between subcarriers in the subcarrier sets is maximized; determining a resource index table by shifting indexes of subcarriers in the default resource index table using an offset received from a base station; receiving an index value of the resource index table from the base station, and acquiring resource information transmitted through a downlink; and receiving data using the acquired resource information.

According to yet another aspect of the present invention, there is provided an apparatus for receiving data in a base station apparatus for allocating resources in a wireless communication system that performs communication using frequency resource. The apparatus includes a memory for dividing subcarriers into subcarrier sets each having a predetermined number of consecutive subcarriers, and storing a resource index table mapped to consecutive indexes such that a distance between subcarriers in the subcarrier sets is maximized; a scheduler for determining a resource to be transmitted through a downlink according to a channel condition, for data to be transmitted to each terminal, allocating a resource based on the resource index table, and providing the allocated resource information; and a transmitter for transmitting data to each terminal using the allocated resource.

According to still another aspect of the present invention, there is provided an apparatus for receiving data in a base station apparatus for allocating resources in a wireless communication system including base stations that perform communication with a terminal using frequency resource. The apparatus includes a controller for controlling an operation of dividing subcarriers into subcarrier sets each having a predetermined number of consecutive subcarriers, generating a default resource index table mapped to consecutive indexes such that a distance between subcarriers in the subcarrier sets is maximized, and generating a resource index table using unique information for each of the base stations from the default resource index table; a memory for storing the resource index table; a scheduler for determining an amount of resources to be transmitted through a downlink according to a channel condition, for data to be transmitted to each terminal, allocating a resource to a terminal using the index value in the resource index table, and providing the allocated resource information; and a transmitter for transmitting data to each terminal using the allocated resource.

According to still another aspect of the present invention, there is provided an apparatus for receiving data in a terminal of a wireless communication system that performs communication using frequency resources. The apparatus includes a controller for controlling an operation of dividing subcarriers into subcarrier sets each having a predetermined number of consecutive subcarriers, generating a default resource index table mapped to consecutive indexes such that a distance between subcarriers in the subcarrier sets is maximized, determining a resource index table by shifting indexes of subcarriers of the default resource index table using an offset received from a base station, acquiring resource information to be received from the base station over a downlink, and receiving data from the acquired information based on the resource index table; a memory for storing the resource index table; and a receiver for receiving resource allocation information from the base station, and extracting data received over the downlink under control of the controller.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
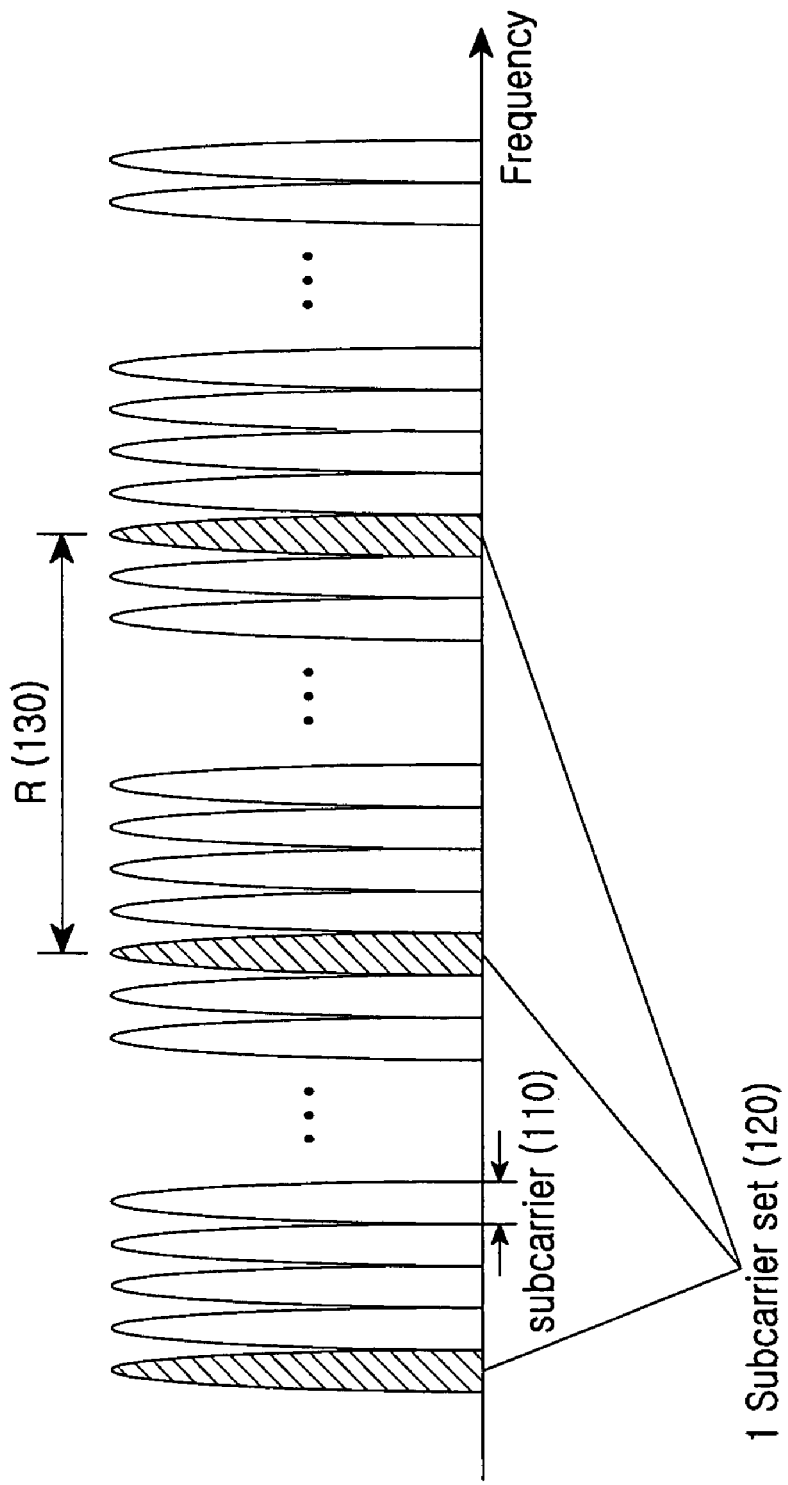
FIG. 1 is a diagram illustrating exemplary unit resources allocable for transmitting data using a frequency diversity technique.
Figure 2:
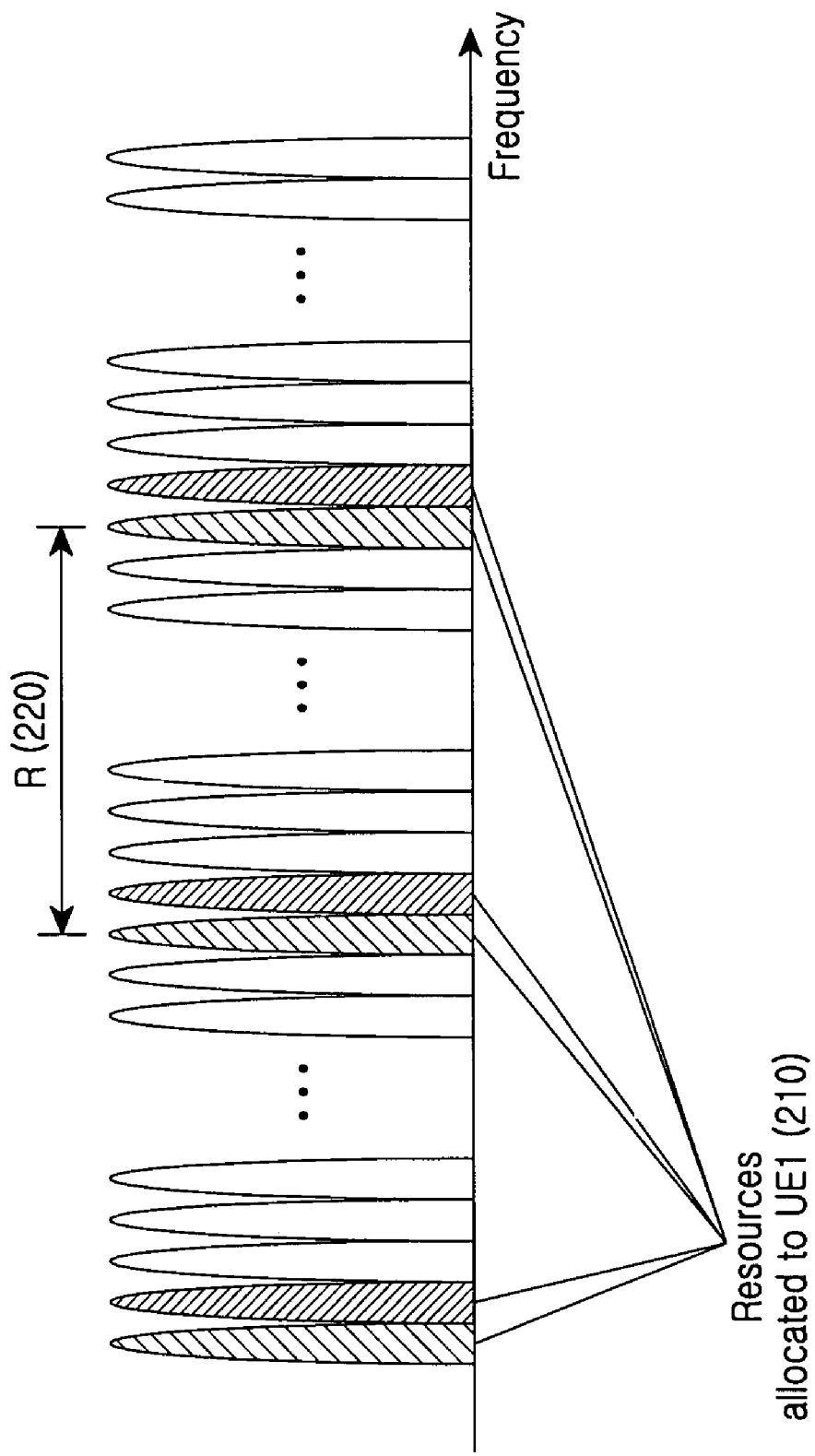
FIG. 2 is a diagram illustrating an exemplary method of allocating more than two subcarrier sets to one terminal.

Preferred embodiments of the present invention will now be described in detail with reference to the annexed drawings. In the following description, a detailed description of known functions and configurations have been omitted for clarity and conciseness.

The present invention provides a resource allocation method that obtains sufficient frequency diversity gain and is implemented with simple signaling, when the conventional method of transmitting data using the frequency diversity technique transmits more than two subcarrier sets to one terminal. The method of the present invention can be applied to every diversity technique-based transmission in the FDMA scheme, such as OFDM and SC-FDMA.

The present invention reconfigures subcarrier sets using new resource indexes, which are mapped to offset values of the subcarrier sets on a one-to-one basis, and then performs resource allocation using the indexes, instead of allocating the subcarrier sets using offset values having correspondence to the frequency domain, as described below. The present invention can use a method for configuring subcarrier sets such that a distance between offsets mapped to n consecutive indexes from an index 0 is maximized, as a method for mapping offsets of subcarrier sets to resource indexes.

Table 1 shows an exemplary method of defining new indexes mapped to offset values using the proposed method when the number of subcarrier sets is sixteen (R=16). In Table 1, when indexes 0 to 3 are allocated to one terminal, a distance between all offsets 0, 8, 4 and 12 of the allocated indexes is 4, efficiently obtaining frequency diversity gain.

With use of a resource index table configured using the foregoing method, in allocating resources to terminals, the base station allocates resource indexes corresponding to the number of offsets of all resources allocated to the terminals without designating the offsets one by one, thereby simply designating resources while maximizing frequency diversity gain, thereby reducing signaling overhead. For example, in Table 1, when the base station intends to allocate 3, 4 and 2 subcarrier sets to terminals 1, 2 and 3, respectively, the base station can designate only resource indexes 2, 6 and 8 instead of designating the offset values to be used by the terminals 1, 2 and 3 one by one. After being allocated the resources, terminal 1 can exchange data with the base station using the offsets 0, 8 and 4 corresponding to the resource indexes 0 to 2 from Table 1, terminal 2 can exchange data with the base station using the offsets 12, 2, 10 and 6 corresponding to the resource indexes 3 to 6, and terminal 3 can exchange data with the base station using the offsets 14 and 1 corresponding to resource indexes 7 and 8.

This method provides efficient resource allocation in the cell managed by the base station. However, when this method is used by a plurality of base stations simultaneously, resources defined in the leading part of the resource index table are often frequently allocated in a plurality of cells, causing a possible problem that interference is concentrated on the subcarriers corresponding to the leading part of the resource index table.

Therefore, another embodiment of the present invention provides a method for generating different resource index tables separately for base stations, and maintaining the characteristic that resource diversity is maximized when resources are allocated from the head of each table.

The present invention defines a default resource index table to generate different resource index tables separately for base stations. The default resource index table, a table satisfying the characteristic of maximizing the frequency diversity, should be known to both the base station and the terminal. In the present invention, the base station transmits cell specific information cell_specific_info, for example, a seed value, that can be used for generating a resource index table used therein, or an offset of a sequence code capable of distinguishing the base station, to the terminals in its cell through a specific physical channel, for example, broadcast channel or common control channel, a location of which is known to both the base station and the terminals. A terminal receiving the information transmitted by the base station can calculate an offset value, i.e. cell specific offset value cell_specific_off-

TABLE 1

| | index (y) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| offset (x) | 0 | 8 | 4 | 12 | 2 | 10 | 6 | 14 | 1 | 9 | 5 | 13 | 3 | 11 | 7 | 5 |

Table 2 shows an exemplary method of defining new indexes mapped to offset values using the proposed method when the number of subcarrier sets is twenty-four (R=24).

set, for using a resource index table in the corresponding cell using a specific method or a function, for example, hash function, predetermined between the base station and the

TABLE 2

| | index (y) | | | | | | | | | | | | | | | | | | | | | | | |
|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| offset (x) | 0 | 12 | 6 | 18 | 3 | 15 | 9 | 21 | 1 | 13 | 7 | 19 | 4 | 16 | 10 | 22 | 2 | 14 | 8 | 20 | 5 | 17 | 11 | 23 | terminal. In an alternative method, the base station can directly transmit the cell specific offset cell_specific_offset over a specific physical channel.

Thereafter, the terminal can generate a cell specific resource index table by shifting an offset row or an index row of the default resource index table to the left or right by a cell specific offset value. The base stations should select and transmit cell specific information so that neighbor base stations may have different cell specific offset values. In this case, even though the resource allocation method proposed by the preset invention is used, first subcarrier offset values used by the base stations for the allocation are different from each other, thus preventing inter-cell interference from being concentrated on a specific subcarrier.

Table 3 shows different resource index tables generated separately for base stations, of the present invention, when the resource index table of Table 1 is used as a default resource index table. In Table 3, for a cell 1, a cell specific offset value is 0. Therefore, the cell 1 allocates resources using the resource index table shown in Table 1. However, for a cell 2, a cell specific offset value is 4, and the cell 2 configures a resource index table by left-shifting an offset row of the default resource index table by a cell specific offset. A cell 3 and a cell 4, like the cell 2, form a resource index table by left-shifting an offset row of the default resource index table by their cell specific offsets.

TABLE 3

| | index (y) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| | Cell 1 cell_specific_offset = 0 | | | | | | | | | | | | | | | |
| offset (x) | 0 | 8 | 4 | 12 | 2 | 10 | 6 | 14 | 1 | 9 | 5 | 13 | 3 | 11 | 7 | 5 |
| | Cell 2 cell_specific_offset = 4 | | | | | | | | | | | | | | | |
| offset (x) | 2 | 10 | 6 | 14 | 1 | 9 | 5 | 13 | 3 | 11 | 7 | 15 | 0 | 8 | 4 | 12 |
| | Cell 3 cell_specific_offset = 8 | | | | | | | | | | | | | | | |
| offset (x) | 1 | 9 | 5 | 13 | 3 | 11 | 7 | 15 | 0 | 8 | 4 | 12 | 2 | 10 | 6 | 14 |
| | Cell 4 cell_specific_offset = 12 | | | | | | | | | | | | | | | |
| offset (x) | 3 | 11 | 7 | 15 | 0 | 8 | 4 | 12 | 2 | 10 | 6 | 14 | 1 | 9 | 5 | 13 |

In order to form a resource index table using the cell specific offset value in this manner, the present invention can transmit a field of Table 4 to all terminals in a cell through a broadcast channel or a common control channel, separately for base stations.

TABLE 4

| Field | Length |
|---|---|
| ... | |
| ResourceTableOffset | n |
| ... | |

A base station that transmitted a ResourceTableOffset field value shown in Table 4, or a terminal receiving the ResourceTableOffset field value, can calculate a value of a cell specific offset using a predetermined function, for example, a generally known function such as a SHA-1 hash function. Equation (1) shows a simple example of the SHA-1 hash function.

$$f(x) = x \% \text{Number\_Of\_SubCarrierSet} \quad (1)$$

In Equation (1), Number_Of_SubCarrierSet denotes the maximum number of subcarrier sets existing in the base station, and x denotes a resource table offset 'ResourceTableOffset'. In addition, % denotes an operation of taking the remainder obtained by dividing the corresponding value by the Number_Of_SubCarrierSet. That is, if the Number_Of_SubCarrierSet in the current cell is 24 and the resource table offset 'ResourceTableOffset' is 8, the cell specific offset is 8 (8% 24=8), and if the Number_Of_SubCarrierSet in the current cell is 24 and the resource table offset 'ResourceTableOffset' is 28, the cell specific offset is 4 (28% 24=4).

After calculating the cell specific offset using the function shown in Equation (1), the base station and the terminal left-shift an offset row of the default resource index table by the cell specific offset value, thereby generating different resource allocation tables separately for base stations.

Alternatively, the base station having a predetermined cell specific offset does not perform a separate calculation process for calculating a cell specific offset, and sets a transmission resource table offset 'ResourceTableOffset' as a cell specific offset, thereby allowing the terminal not to undergo a separate calculation process.

With reference to the accompanying flowcharts, a description will now be made of a base station operation of allocating resources using the foregoing method, and a terminal operation corresponding thereto.

Figure 3:
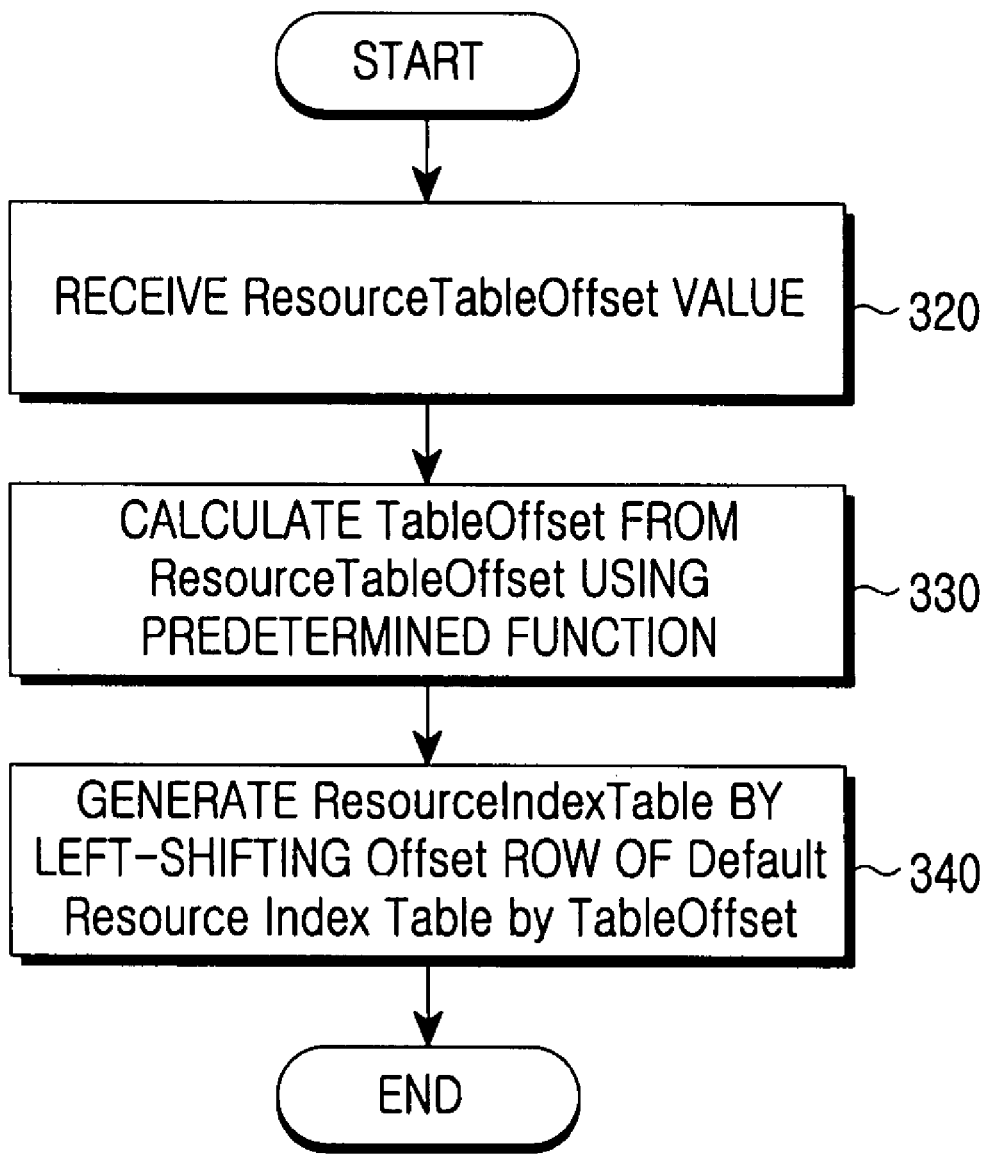
FIG. 3 is a flowchart illustrating a process of generating a resource allocation table in a terminal according to an embodiment of the present invention.

FIG. 3 is a flowchart illustrating a process of generating a resource allocation table in a terminal according to an embodiment of the present invention. In step 320, a terminal receives a resource table offset value 'ResourceTableOffset' transmitted by a base station in the form of Table 3, through a specific physical channel, for example, broadcast channel or common control channel, a location of which is known to both the base station and the terminal. The resource table offset has the same value as the cell specific offset. In step 330, the terminal calculates a table offset value from the resource table offset value using a function predetermined between the base station and the terminal. In step 340, the terminal generates a resource index table used in the corresponding cell by left-shifting an offset row of the default resource index table by the table offset value.

Figure 4:
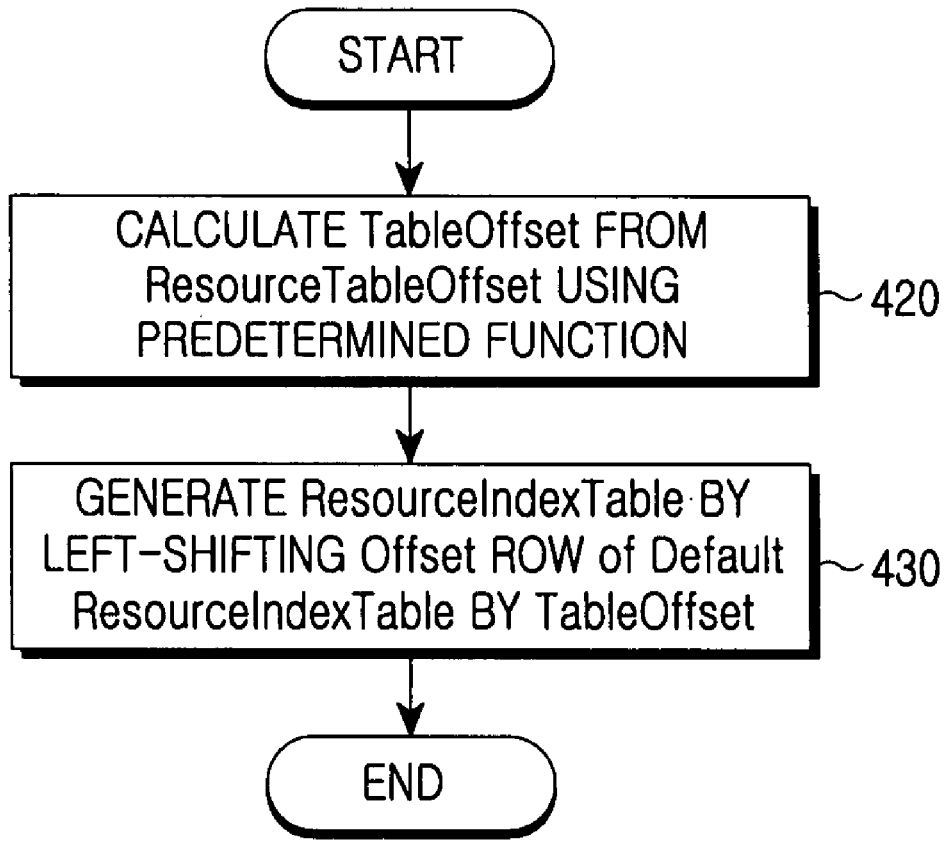
FIG. 4 is a flowchart illustrating a process of generating different resource allocation tables for different base stations in a base station according to an embodiment of the present invention.

FIG. 4 is a flowchart illustrating a process of generating different resource allocation tables for different base stations in a base station according to an embodiment of the present invention. In step 420, a base station calculates a table offset value from the resource table offset value, shown in Table 4, transmitted through a specific physical channel, for example, broadcast channel or common control channel, known to both the base station and a terminal, using a function predetermined between the base station and the terminal. Herein, the table offset value means the cell specific offset. The table offset value can be previously set by the system operator such that base stations have different table offset values according to locations thereof. In an alternative method, based on a specific rule, the base station can set a new table offset value each time it is activated. Because this is an operational issue, a description thereof is not given herein. After calculating the offset value, the base station generates in step 430 a resource index table to be used for a corresponding cell by left-shifting an offset row of the default resource index table by the table offset value.

A description will now be made of operations of a terminal and a base station during downlink transmission for the case where the same resource index tables are generated in each base station and a terminal in communication therewith using the foregoing method.

Figure 5:
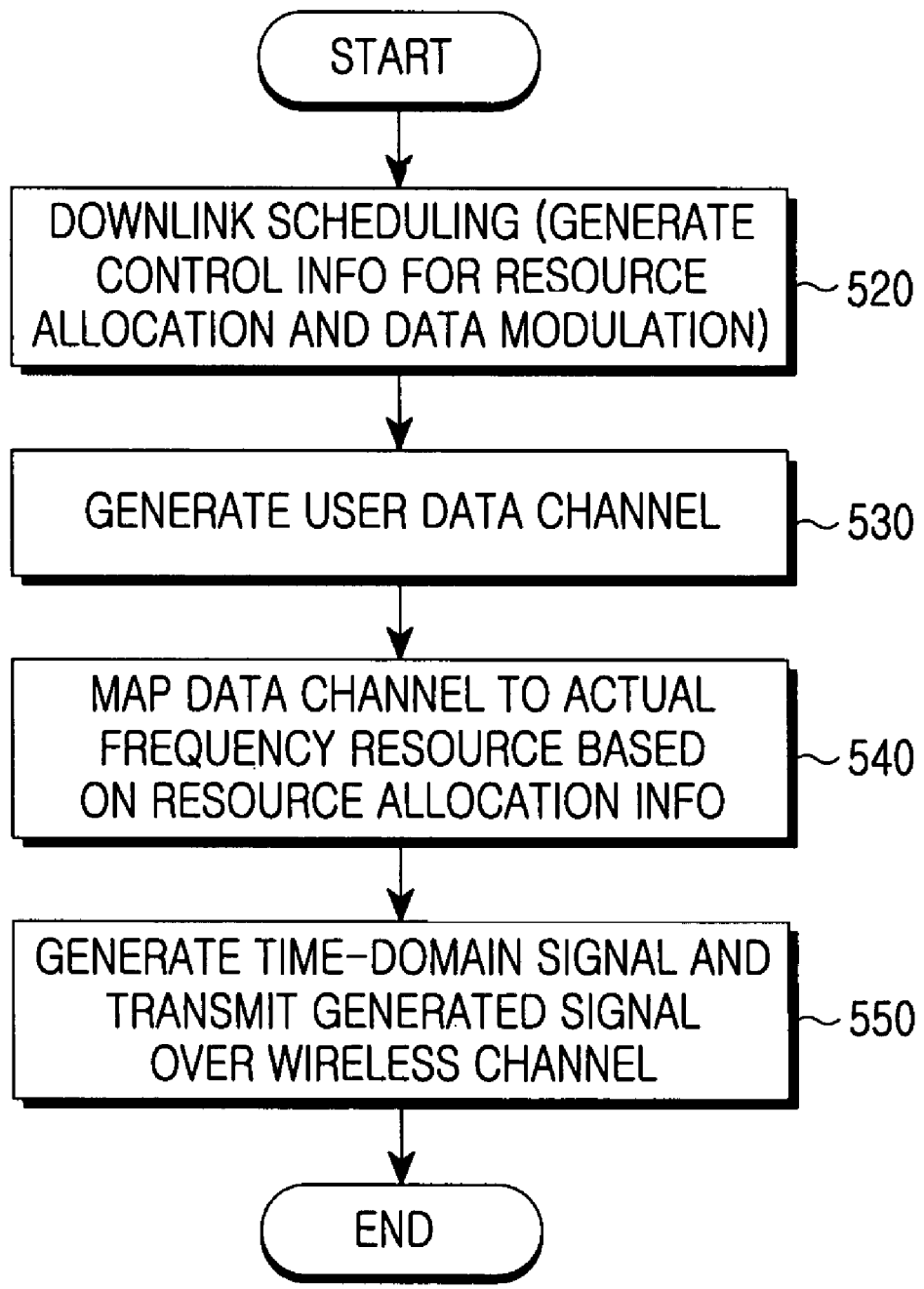
FIG. 5 is a flowchart illustrating a process of performing resource allocation and data transmission to a terminal in a base station according to an embodiment of the present invention.

FIG. 5 is a flowchart illustrating a process of performing resource allocation and data transmission to a terminal in a base station according to an embodiment of the present invention. In step 520, a base station performs a downlink scheduling operation based on channel information of each terminal. That is, the base station generates, in step 520, control information necessary for resource allocation and data generation (including modulation and error coding) for each individual terminal. Thereafter, the base station generates a data channel for each individual terminal based on the information in step 530, and actually maps symbols of the data channel to resources in the frequency domain based on the resource allocation information in step 540. In step 550, the base station converts the signal mapped in step 540 into a time-domain signal and transmits the signal over a wireless channel.

Figure 6:
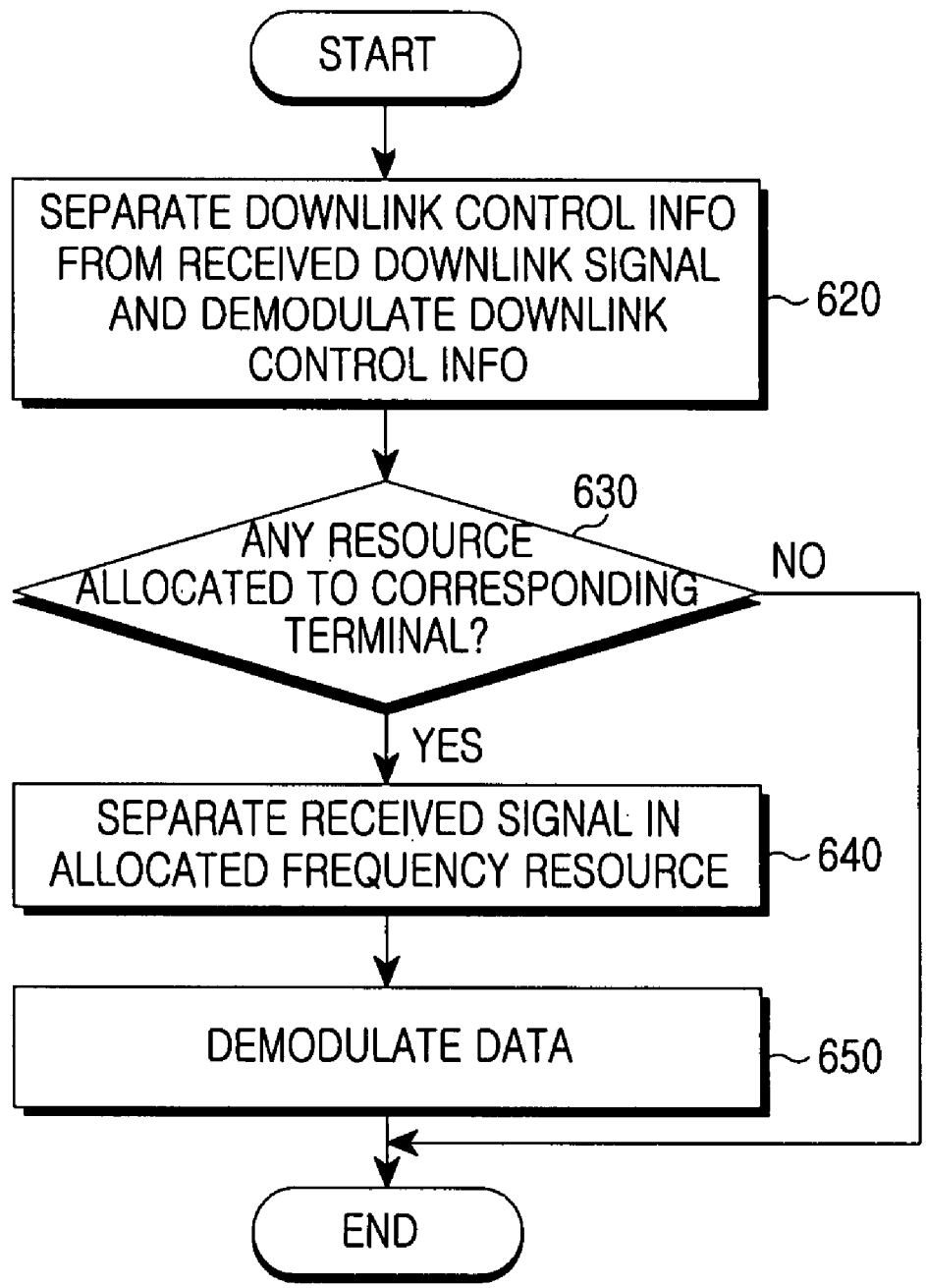
FIG. 6 is a flowchart illustrating a process of receiving data transmitted through a downlink after resource allocation in a terminal according to an embodiment of the present invention.

FIG. 6 is a flowchart illustrating a process of receiving data transmitted through a downlink after resource allocation in a terminal according to an embodiment of the present invention. In step 620, a terminal separates from a received downlink signal a downlink control information channel transmitted through a predetermined resource, and demodulates the separated downlink control information channel. Thereafter, based on the control information, the terminal determines in step 630 whether a resource is allocated thereto at a corresponding time and data is transmitted through it. If it is determined that resource allocation and data transmission exists, the terminal separates a received signal only for the corresponding terminal in the allocated frequency resource in step 640, and demodulates the data signal based on the received signal in step 650, and then ends the routine. However, if it is determined that there is not allocated resource and data transmission in step 630, the terminal directly ends the process.

Figure 7:
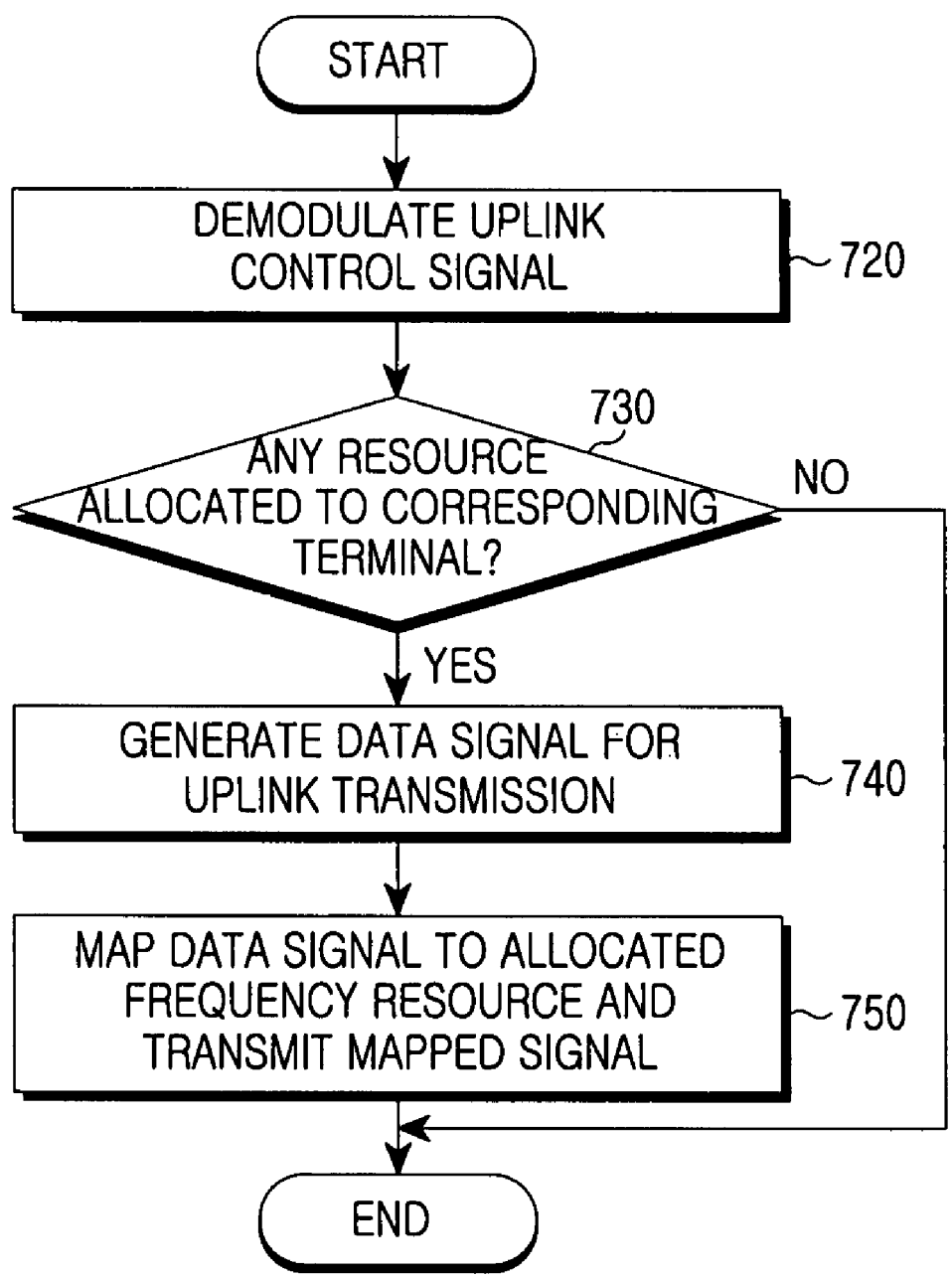
FIG. 7 is a flowchart illustrating a process of transmitting data over an uplink in a terminal according to an embodiment of the present invention.

FIG. 7 is a flowchart illustrating a process of transmitting data over an uplink in a terminal according to an embodiment of the present invention. A terminal demodulates an uplink control signal in step 720, and, based on the control signal, determines in step 730 whether a frequency resource for uplink transmission is allocated thereto at a corresponding time. If it is determined in step 730 that there is a resource allocated thereto, the terminal generates symbols of a data channel for uplink transmission in step 740. In step 750, the terminal maps the data symbols to the allocated frequency resource, converts the mapped signal into a time-domain signal, and transmits the time-domain signal. However, if it is determined in step 730 that there is no resource allocated to the terminal, the terminal ends the process.

Figure 8:
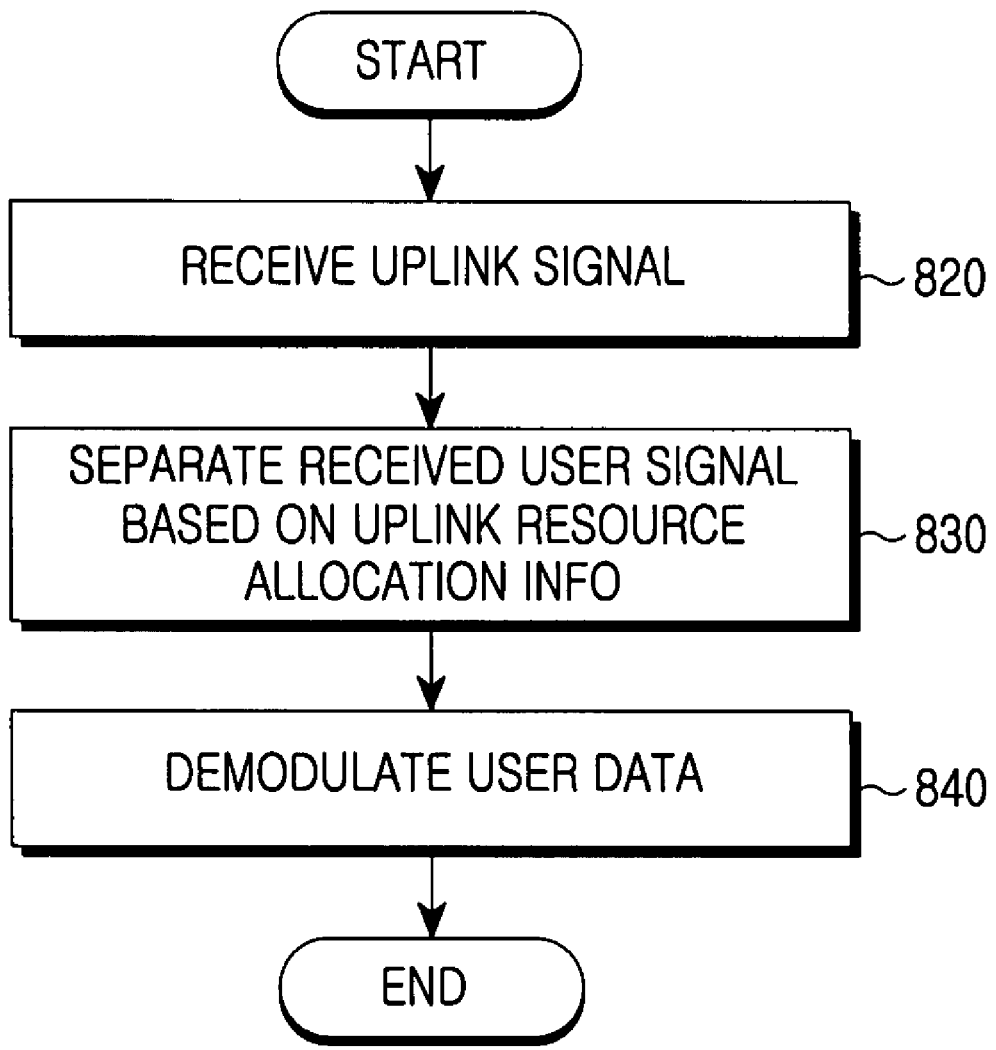
FIG. 8 is a flowchart illustrating a process of receiving data over an uplink in a base station according to an embodiment of the present invention.

FIG. 8 is a flowchart illustrating a process of receiving data over an uplink in a base station according to an embodiment of the present invention. A base station receives an uplink signal in step 820, and separates received signals separately for terminals based on uplink resource allocation information in step 830. In step 840, the base station performs data demodulation separately for the terminals using the signals separated in step 830, and then ends the process.

In the foregoing downlink/uplink resource allocation, resources are allocated based on different resource allocation tables for base stations in the forgoing method, and data is transmitted through the allocated resources. A description will now be made of a structure for transmitting uplink/downlink data for a base station apparatus and a terminal apparatus according to an embodiment of the present invention.

Figure 9A:
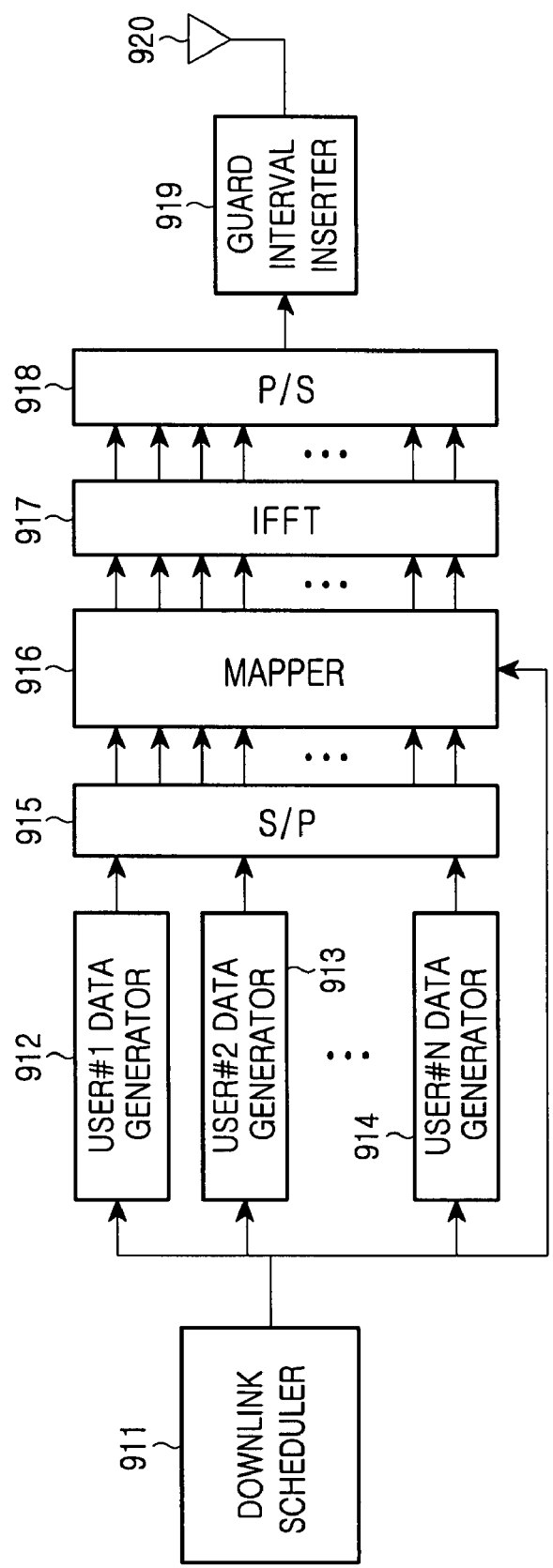
FIG. 9A is a block diagram illustrating a base station transmitter for transmitting data according to an embodiment of the present invention.
Figure 9B:
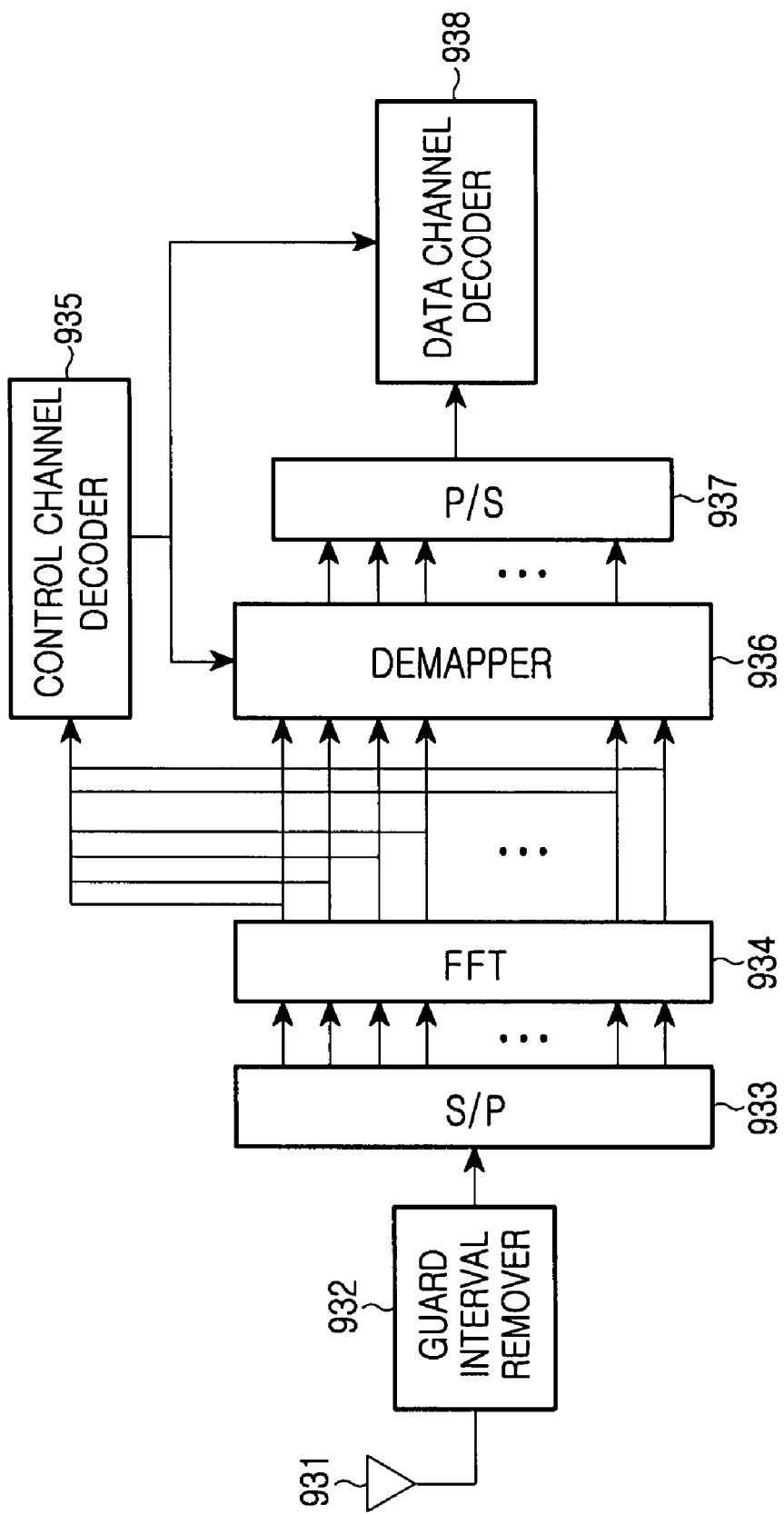
FIG. 9B is a block diagram illustrating a terminal receiver for receiving data according to an embodiment of the present invention.

FIG. 9A is a block diagram illustrating a base station transmitter for transmitting data according to an embodiment of the present invention, and FIG. 9B is a block diagram illustrating a terminal receiver for receiving data according to an embodiment of the present invention. With reference to FIGS. 9A and 9B, a description will now be made of a structure and operation of a base station apparatus for transmitting downlink data and a structure and operation of a terminal apparatus for receiving the downlink data.

Although not illustrated in FIG. 9A, the base station transmitter includes a memory for storing the default resource index table. The memory stores an offset value of the base station if needed. Further, although not illustrated in FIG. 9A, the base station transmitter can separately include a controller for generating, from the default resource index table, a resource index table to be used in the corresponding base station. In an alternative example, this process can be achieved in a scheduler. In addition, the memory can include a region for storing a resource index table generated based on the offset value according to the present invention.

A downlink scheduler 911, a scheduler for determining downlink resource allocation information, generates not only the resource information allocated to each terminal, but also control information, such as information on generation and demodulation of symbols of a data channel for an error coding and modulation method for each individual terminal, and provides the generated information to data generators 912, 913, 914, . . . , for individual users. The user data generators 912, 913, 914, . . . , which are symbol generators for data channels, encodes and modulates the data to be transmitted to corresponding UEs under the control of the downlink scheduler 911. Each user data generator 912, 913, 914, . . . , can include error correction coding, rate matching, interleaving, and symbol modulation blocks.

Data symbols from the user data generators 912, 913, 914, . . . , are input to a serial-to-parallel converter (S/P) 915. The serial-to-parallel converter 915 converts the serial input data symbols into parallel signals separately for users, and outputs the parallel signals to a mapper 916. The mapper 916 maps the converted parallel data symbols to actual frequency resources allocated separately for terminals. This mapping is performed based on resource allocation table information separately included in each base station according to the present invention. That is, the mapper 916 maps data symbols to be transmitted to each individual user according to an offset value of an index or a subcarrier set, which is resource allocation information. The data symbols of all terminals, which are mapped by the mapper 916 to subcarriers which are actual frequency resources, are converted into time-domain signals by an Inverse Fast Fourier Transfer (IFFT) block 917. The parallel time-domain signals are converted into a serial OFDM sample signal by a parallel-to-serial converter (P/S) 918. Thereafter, a guard interval is inserted into the serial OFDM sample signal by a guard interval inserter 919. The guard interval inserter 919 generally uses a guard interval insertion method. For example, the guard interval insertion method is a Cyclic Prefix method of repeating a part of the OFDM samples. The signal output from the guard interval inserter 919 is transmitted over a wireless channel via a transmission antenna(s) 920.

With reference to FIG. 9B, a description will now be made of a terminal receiver in a downlink. Although not illustrated in FIG. 9B, the terminal receiver includes a memory for storing a default resource index table. The memory can include a region for storing resource index table information used in a corresponding base station based on an offset value received from the base station. Therefore, although not illustrated in FIG. 9B, a controller of the terminal performs an operation of converting default resource index table information into a resource index table used in the corresponding base station using an offset value received from the base station.

A guard interval signal is removed from a signal received via a reception antenna(s) 931 by a guard interval remover 932. The guard interval removed-signal from the guard interval remover 932 is converted into parallel signals by a serial-to-parallel converter (S/P) 933. The parallel signals output from the serial-to-parallel converter 933 are input to a Fast Fourier Transfer (FFT) block 934. The FFT block 934 converts the input time-domain signals into frequency-domain signals. Control signals in the output signals of the FFT block 934 are input to a control channel decoder 935 where the control information is demodulated and decoded. A demapper 936 extracts the data transmitted with a frequency resource for a corresponding terminal from the output signal of the FFT block 934, using the control information demodulated and decoded by the control channel decoder 935. The control information is determined according to an offset value of an index or a subcarrier set, and a mapping relationship between the two is defined in the method proposed by the present invention. The received signal for the terminal, separated by the demapper 936, is input to a parallel-to-serial converter (P/S) 937 where it is converted into a serial signal. The serial signal output from the parallel-to-serial converter 937 is demodulated and decoded by a data channel decoder 938. The data channel decoder 938 demodulates and decodes the signal transmitted to the terminal using the control information output from the control channel decoder 935. The demodulation and decoding process are known to those skilled in the art. A description will now be made of uplink transmission. In an uplink transmission process, a terminal receives scheduling information over a downlink and then transmits data on a resource allocated based thereon, and a base station demodulates the transmitted data.

Figure 10A:
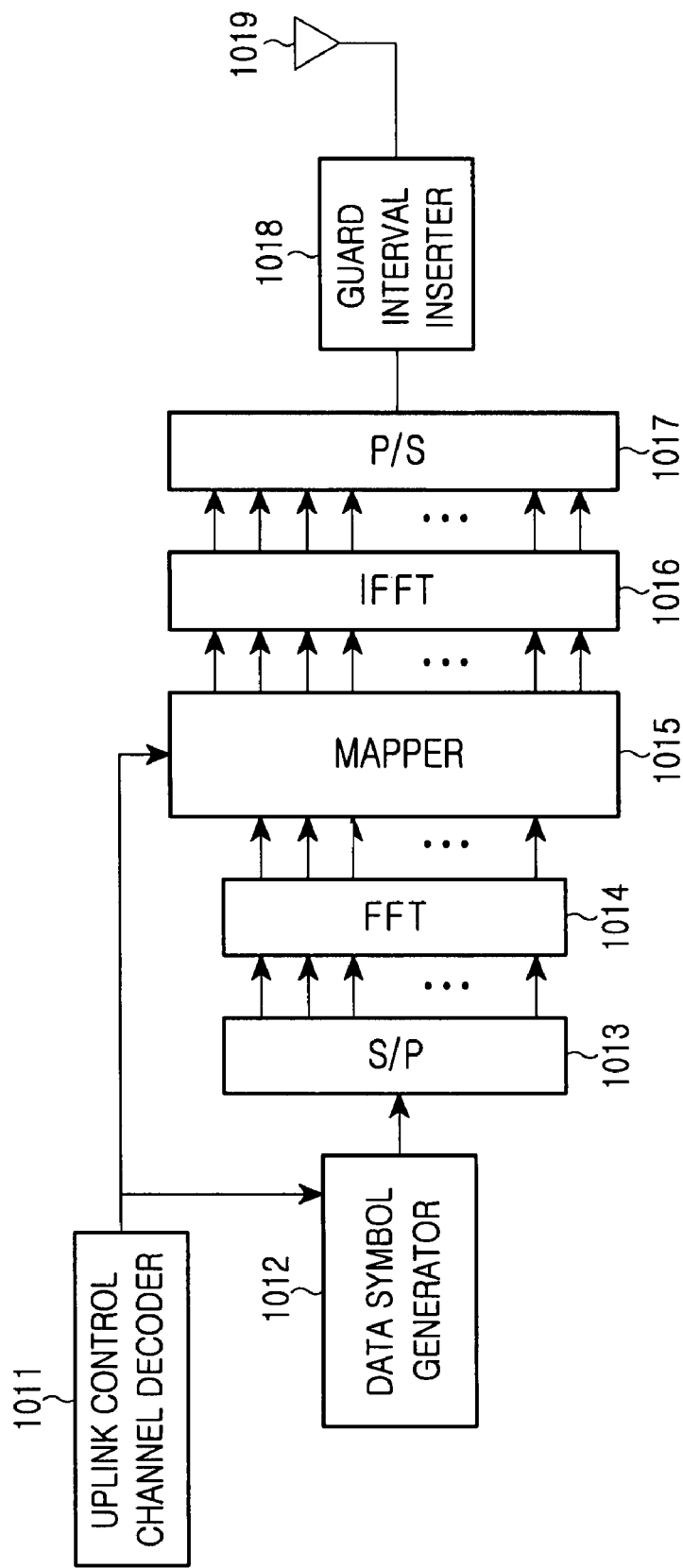
FIG. 10A is a block diagram illustrating a terminal transmitter for transmitting uplink data according to an embodiment of the present invention.
Figure 10B:
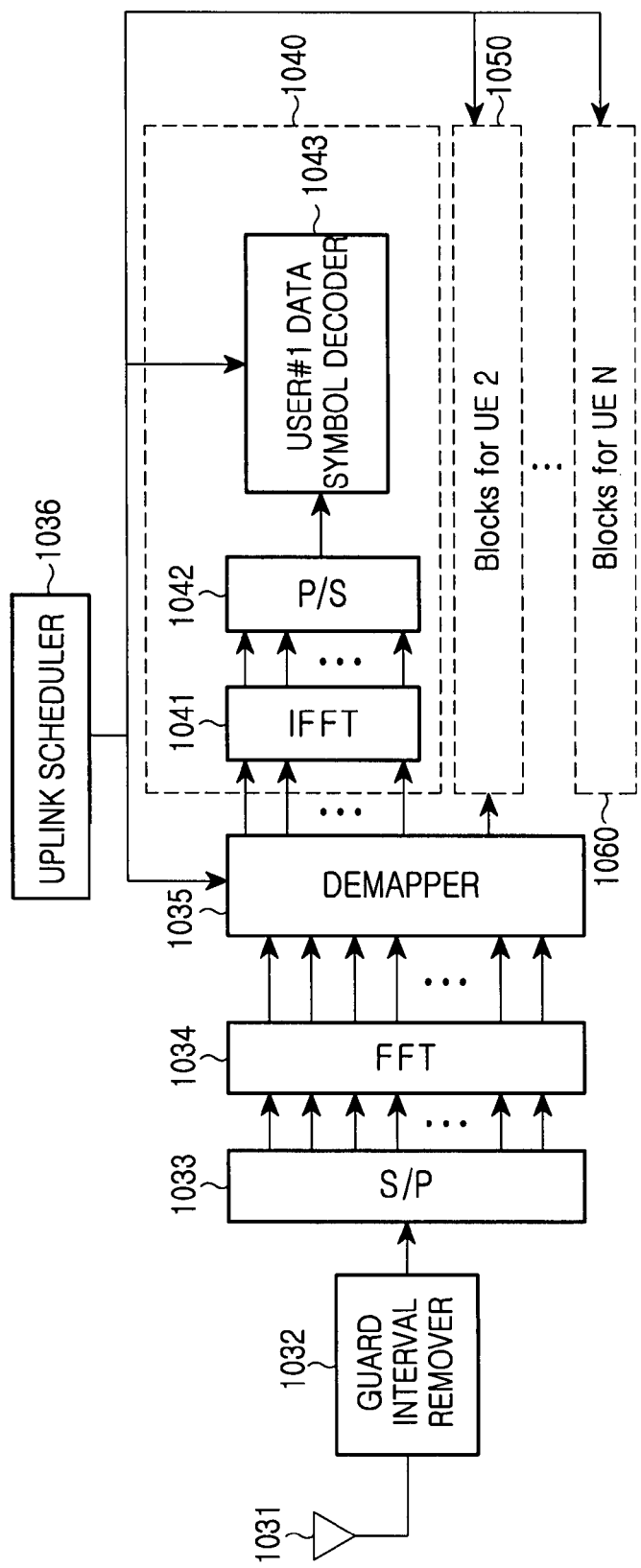
FIG. 10B is a block diagram illustrating a base station receiver for receiving uplink data according to an embodiment of the present invention.

FIG. 10A is a block diagram illustrating a terminal transmitter for transmitting uplink data according to an embodiment of the present invention, and FIG. 10B is a block diagram illustrating a base station receiver for receiving uplink data according to an embodiment of the present invention. With reference to FIGS. 10A and 10B, a description will now be made of structure and operation of a terminal transmitter and a base station receiver for SC-FDMA uplink transmission/reception. Controllers and memories of FIGS. 10A and 10B are equivalent to those described in FIGS. 9A and 9B, so a description thereof will be omitted herein.

With reference to FIG. 10A, a description will now be made of a structure and operation of a terminal transmitter for transmitting an uplink signal. An uplink control channel decoder 1011 decodes an uplink control information channel received through a downlink in a previous slot, and outputs frequency resource information allocated to the terminal and control information necessary for data generation. The control information necessary for data generation is input to a data symbol generator 1012, and the frequency resource information is input to a mapper 1015. The data symbol generator 1012 generates uplink data symbols based on the control information, and outputs the uplink data symbols to a serial-to-parallel converter (S/P) 1013. The serial-to-parallel converter 1013 converts the serial input signals into parallel signals, and outputs the parallel signals to an FFT block 1014. The FFT block 1014 converts the time-domain signals into frequency-domain signals. Here, the FFT block 1014 is equal in size to the number of data symbols generated in the data symbol generator 1012. Output signals of the FFT block 1014 are mapped to frequency resources actually allocated to the corresponding terminal by the mapper 1015. Here, the uplink control information demodulated and decoded by the uplink control channel decoder 1011 is used as information on the allocated frequency resources. Output signals of the mapper 1015 are converted into time-domain signals by an IFFT block 1016. The IFFT block 1016 is equal in size to the total number of subcarriers including a guard interval. The parallel time-domain signals are converted into a serial signal by a parallel-to-serial converter (P/S) 1017, and then input to a guard interval inserter 1018. The guard interval inserter 1018 inserts a guard interval into the serial input signal. The guard interval generally has a Cyclic Prefix symbol format formed by repeating a part of an input signal. The guard interval-inserted signal output from the guard interval inserter 1018 is transmitted over a wireless channel via transmission antenna(s) 1019. The structure of generating data symbols in the time domain, converting the time-domain signal into a frequency-domain signal through the FFT block 1014, mapping the frequency-domain signal to a specific frequency resource, and then converting the mapped frequency-domain signal back into a time-domain signal through the IFFT block 1016 before transmission, corresponds to a basic SC-FDMA transmitter.

With reference to FIG. 10B, a description will now be made of a structure and operation of a base station receiver for receiving the uplink signal. A guard interval signal is removed from a signal received via a reception antenna(s) 1031 by a guard interval remover 1032, and then input to a serial-to-parallel converter (S/P) 1033 where the guard interval-removed signal is converted into parallel signals. The output signals of the serial-to-parallel converter 1033 are converted into frequency-domain signals by an FFT block 1034. The output signals of the FFT block 1034 are input to a demapper 1035 that separates signals received separately for terminals. For this operation, resource allocation information for each individual terminal, determined by an uplink scheduler 1036, is used. Therefore, the received signals separated by the demapper 1035 are input to user data processors 1040, 1050, 1060, . . . , provided separately for the terminals. Because the user data processors 1040, 1050, 1060, . . . , are all equal in internal structure, an internal structure of only the user#1 data processor 1040 will be described herein by way of example.

The user#1 data processor 1040 includes an IFFT block 1041, a parallel-to-serial converter (P/S) 1042, and a user#1 data symbol decoder 1043. The IFFT block 1041 converts a received signal for a UE1 into a time-domain signal, and outputs the time-domain signal to the parallel-to-serial converter 1042. The parallel-to-serial converter 1042 converts the input parallel signals into a serial signal, and outputs the serial signal to the user#1 data symbol decoder 1043. The user#1 data symbol decoder 1043 demodulates and decodes data using the control information received from the uplink scheduler 1036.

As can be understood from the foregoing description, the wireless communication system according to the present invention allocates resources using different patterns for different neighbor base stations, thereby facilitating interference cancellation. In addition, in intra-cell resource allocation, the system can acquire diversity gain.

While the invention has been shown and described with reference to a certain preferred embodiment thereof, it will be understood by those skilled in the art that various changes in form and details may be made therein without departing from the spirit and scope of the invention, as defined by the appended claims.

What is claimed is:

1. A method for allocating resources in a base station of a wireless communication system that performs communication using frequency resources, the method comprising:
    dividing subcarriers into subcarrier sets each having a predetermined number of subcarriers, and generating a resource index table in which an offset of a subcarrier set is mapped to a resource index such that a distance between the subcarrier sets is maximized; and
    allocating resources to a terminal using the resource index table.

2. The method of claim 1, wherein when more than two subcarrier sets are allocated to the terminal, a last index value allocated in the resource index table is transmitted.

3. The method of claim 1, wherein when resources of a plurality of subcarrier sets are allocated to a specific terminal, the resource index of each subcarrier set is transmitted.

4. A method for allocating resources in a wireless communication system including base stations that perform communication with a terminal using frequency resources, the method comprising:
    dividing subcarriers into subcarrier sets each having a predetermined number of subcarriers, and generating a default resource index table in which an offset of a subcarrier set is mapped to a resource index such that a distance between the subcarrier sets is maximized;
    generating a resource index table by shifting the default resource index table; and
    allocating resources to the terminal using the resource index table.

5. The method of claim 4, further comprising providing the generated resource index table during signaling with the terminal.

6. The method of claim 4, wherein the generation of a resource index table comprises:
    shifting an offset row or an index row of the subcarrier set by a cell specific offset value.

7. The method of claim 6, wherein the cell specific offset value is calculated using a hash function.

8. The method of claim 7, wherein the base station transmits the cell specific offset value to the terminal.

9. The method of claim 7, wherein the cell specific offset value is generated using a resource table offset transmitted to the terminal by the base station.

10. The method of claim 7, wherein the cell specific offset value is generated using base station's unique information transmitted to the terminal by the base station.

11. The method of claim 10, wherein the unique information includes a seed value allocated for every cell.

12. The method of claim 10, wherein the unique information includes a sequence code of a cell.

13. A method for receiving data in a terminal of a wireless communication system that performs communication using frequency resources, the method comprising:
    dividing subcarriers into subcarrier sets each having a predetermined number of subcarriers, and generating a default resource index table assigned to an index such that a distance between the subcarrier sets is maximized;
    determining a resource index table by shifting the default resource index table using a cell specific offset;
    acquiring resource information transmitted through a downlink; and
    receiving data using the acquired resource information.

14. The method of claim 13, wherein the generation of a resource index table comprises:
    shifting an offset row or an index row of the subcarrier set by a cell specific offset value.

15. The method of claim 14, wherein the terminal receives the cell specific offset value from the base station.

16. The method of claim 14, wherein the cell specific offset value is generated using a resource table offset that the terminal received from the base station.

17. The method of claim 14, wherein the cell specific offset value is generated using base station's unique information that the terminal received from the base station.

18. The method of claim 17, wherein the unique information includes a seed value allocated for every cell.

19. The method of claim 17, wherein the unique information includes a sequence code of a cell.

20. The method of claim 14, wherein the cell specific offset value is calculated using a hash function.

21. The method of claim 13, further comprising:
    receiving the generated resource index table during signaling with the base station.

22. An apparatus for transmitting/receiving data in a base station apparatus for allocating resources in a wireless communication system that performs communication using frequency resource, the apparatus comprising:
    a memory for dividing subcarriers into subcarrier sets each having a predetermined number of subcarriers, and storing a resource index table in which an offset of a subcarrier set is mapped to a resource index such that a distance between subcarriers in the subcarrier set is maximized;
    a scheduler for allocating a resource based on the resource index table, and providing the allocated resource information; and
    a transmitter for transmitting data to each terminal using the allocated resource.

23. The apparatus of claim 22, wherein the scheduler transmits a last index value allocated in the resource index table when more than two subcarriers are allocated to the terminal in the same subcarrier set.

24. An apparatus for transmitting/receiving data in a base station apparatus for allocating resource in a wireless communication system including base stations that perform communication with a terminal using frequency resources, the apparatus comprising:
    a controller for controlling an operation of dividing subcarriers into subcarrier sets each having a predetermined number of subcarriers, generating a default resource index table in which an offset of a subcarrier set is mapped to a resource index such that a distance between subcarriers in the subcarrier set is maximized, and generating a resource index table using unique information for each of the base stations from the default resource index table;
    a memory for storing the resource index table;
    a scheduler for allocating a resource to the terminal using the index value in the resource index table, and providing the allocated resource information; and
    a transmitter for transmitting data to each terminal using the allocated resource.

25. The apparatus of claim 24, wherein the unique information is a seed value allocated for every cell.

26. The apparatus of claim 24, wherein the unique information is a sequence code of a cell.

27. The apparatus of claim 24, wherein while generating the resource index table, the controller generates an offset value using the unique information, and shifts subcarriers mapped to the default resource index table by the generated offset value.

28. The apparatus of claim 27, wherein the offset value is calculated using a hash function.

29. The apparatus of claim 28, wherein the controller transmits the generated offset value to terminals using the transmitter.

30. The apparatus of claim 24, wherein the controller transmits the generated resource index table using the transmitter during signaling with the terminal.

31. An apparatus for transmitting/receiving data in a terminal of a wireless communication system that performs communication using frequency resources, the apparatus comprising:
    a controller for controlling an operation of dividing subcarriers into subcarrier sets each having a predetermined number of subcarriers, generating a default resource index table in which an offset of a subcarrier set is mapped to a resource index such that a distance between subcarriers in the subcarrier set is maximized, determining a resource index table by shifting indexes of subcarriers of the default resource index table using a cell specific offset, acquiring resource information to be received from the base station over a downlink, and receiving data from the acquired information based on the resource index table;
    a memory for storing the resource index table; and
    a receiver for receiving resource allocation information from the base station, and extracting data received over the downlink under control of the controller.

32. A method for allocating resources in a base station of a wireless communication system that performs communication using frequency resources, the method comprising:
    dividing subcarriers into subcarrier sets each having a predetermined number of subcarriers, and storing a resource index table in which an offset of a subcarrier set is mapped to a resource index such that a distance between subcarriers in the subcarrier set is maximized; and
    allocating resources to a terminal using the resource index table.

33. The method of claim 32, further comprising:
    providing the generated resource index table during signaling with the terminal.

34. A method for allocating resources in a wireless communication system including base stations that perform communication with a terminal using frequency resources, the method comprising:
    dividing subcarriers into subcarrier sets each having a predetermined number of subcarriers, and storing a default resource index table in which an offset of a subcarrier set is mapped to a resource index such that a distance between subcarrier sets is maximized;
    generating a resource index table by shifting the default resource index table; and
    allocating resources to the terminal using the resource index table.

35. The method of claim 34, wherein the generation of a resource index table comprises:
    shifting an offset row or an index row of the subcarrier set by a cell specific offset value.

36. The method of claim 35, wherein the base station transmits the cell specific offset value to the terminal.

37. The method of claim 35, wherein the cell specific offset value is generated using a resource table offset transmitted to the terminal by the base station.

38. The method of claim 35, wherein the cell specific offset value is generated using base station's unique information transmitted to the terminal by the base station.

39. A method for transmitting/receiving data in a terminal of a wireless communication system that performs communication using frequency resources, the method comprising:
    dividing subcarriers into subcarrier sets each having a predetermined number of subcarriers, and storing a default resource index table assigned to a resource index such that a distance between subcarrier sets is maximized;
    determining a resource index table by shifting the default resource index table using a cell specific offset;
    receiving an index value of the resource index table from the base station, and acquiring resource information transmitted through a downlink; and
    receiving data using the acquired resource information.

40. The method of claim 39, wherein the generation of the generation of a resource index table comprises:
    shifting an offset row or an index row of the subcarrier set by a cell specific offset value.

41. The method of claim 40, wherein the terminal receives the cell specific offset value from the base station.

42. The method of claim 40, wherein the cell specific offset value is generated using a resource table offset that the terminal received from the base station.

43. The method of claim 40, wherein the cell specific offset value is generated using base station's unique information that the terminal received from the base station.

44. The method of claim 43, wherein the unique information includes a seed value allocated for every cell.

45. The method of claim 43, wherein the unique information includes a sequence code of a cell.

46. The method of claim 40, wherein the cell specific offset value is calculated using a hash function.

47. The method of claim 39, further comprising:
    receiving the generated resource index table during signaling with the base station.

48. An apparatus for transmitting/receiving data in a base station apparatus for allocating resources in a wireless communication system including base stations that perform communication with a terminal using frequency resources, the apparatus comprising:
    a controller for controlling an operation of dividing subcarriers into subcarrier sets each having a predetermined number of subcarriers, generating a default resource index table in which an offset of a subcarrier set is mapped to a resource index such that a distance between subcarrier sets is maximized, and generating a resource index table using resource table offset from the default resource index table;
    a memory for storing the resource index table;
    a scheduler for allocating a resource to the terminal using the index value in the resource index table, and providing the allocated resource information; and
    a transmitter for transmitting data to each terminal using the allocated resource.

49. An apparatus for transmitting/receiving data in a base station apparatus for allocating resources in a wireless communication system including base stations that perform communication with a terminal using frequency resources, the apparatus comprising:
- a memory for storing a resource index table in which an offset of a subcarrier set is mapped to a resource index such that a distance between the subcarrier sets is maximized and a cell specific offset for using the resource index table in a corresponding cell;
- a controller for controlling transmission of the stored cell specific offset to the terminal;
- a scheduler for allocating a resource to the terminal using the index value in the resource index table, and providing the allocated resource information; and
- a transmitter for transmitting data to each terminal using the allocated resource.

50. An apparatus for transmitting/receiving data in a base station apparatus for allocating resources in a wireless communication system including base stations that perform communication with a terminal using frequency resources, the apparatus comprising:
- a memory for storing a resource index table in which an offset of a subcarrier set is mapped to a resource index such that a distance between the subcarrier sets is maximized and a cell specific offset for using the resource index table in a corresponding cell;
- a controller for controlling transmission of the stored resource index table to the terminal;
- a scheduler for allocating a resource to the terminal using the index value in the resource index table, and providing the allocated resource information; and
- a transmitter for transmitting data to each terminal using the allocated resource.

51. An apparatus for transmitting/receiving data in a terminal of a wireless communication system that performs communication using frequency resources, the apparatus comprising:
- a memory for storing a default resource index table and a cell specific offset for using the resource index table, in which an offset of a subcarrier set is mapped to a resource index such that a distance between the subcarrier sets is maximized, in a corresponding cell;
- a controller for controlling an operation of determining the resource index table by shifting indexes of subcarriers of the default resource index table using the cell specific offset, acquiring resource information to be received from a base station through a downlink, and receiving data from the acquired information based on the resource index table; and
- a receiver for receiving resource allocation information from the base station, and extracting data received over the downlink under control of the controller.

* * * * *